(12) United States Patent
Kühl et al.

(10) Patent No.: US 7,430,217 B2
(45) Date of Patent: Sep. 30, 2008

(54) METHOD AND APPARATUS OF PRIORITISING THE USAGE OF SLOTTED LINKS BY SINGLE NETWORK DEVICES IN A WIRELESS NETWORK

(75) Inventors: Carmen Kühl, Dortmund (DE); Simon Baatz, St. Augustin (DE); Christoph Scholz, Lohmar (DE)

(73) Assignee: Spyder Navigations L.L.C., Wilmington, DE (US)

( * ) Notice: Subject to any disclaimer, the term of this patent is extended or adjusted under 35 U.S.C. 154(b) by 1138 days.

(21) Appl. No.: 10/108,859

(22) Filed: Mar. 29, 2002

(65) Prior Publication Data

US 2002/0142789 A1    Oct. 3, 2002

(30) Foreign Application Priority Data

Mar. 29, 2001    (EP) ................................ 01108032

(51) Int. Cl.
| | |
|---|---|
| H04L 12/413 | (2006.01) |
| H04L 12/43 | (2006.01) |
| H04B 7/212 | (2006.01) |
| H04J 3/02 | (2006.01) |
| H04J 3/16 | (2006.01) |

(52) U.S. Cl. ........................ 370/455; 370/337; 370/461; 370/462; 370/468

(58) Field of Classification Search ........................ None
See application file for complete search history.

(56) References Cited

U.S. PATENT DOCUMENTS

| | | | | |
|---|---|---|---|---|
| 5,008,883 A | * | 4/1991 | Eizenhofer et al. | .......... 370/348 |
| 5,594,738 A | * | 1/1997 | Crisler et al. | ............... 370/347 |
| 5,901,363 A | | 5/1999 | Toyryla | |
| 6,480,505 B1 | * | 11/2002 | Johansson et al. | ........... 370/449 |
| 6,928,085 B2 | * | 8/2005 | Haartsen | ...................... 370/462 |
| 6,944,148 B1 | * | 9/2005 | Gehring et al. | ............. 370/347 |
| 6,963,534 B1 | * | 11/2005 | Shorey et al. | ............... 370/230 |
| 6,975,613 B1 | * | 12/2005 | Johansson | ................... 370/338 |
| 7,016,372 B2 | * | 3/2006 | Haartsen | ...................... 370/461 |
| 7,058,050 B2 | * | 6/2006 | Johansson et al. | ........... 370/386 |
| 2002/0150075 A1 | * | 10/2002 | Belcea | ........................ 370/347 |
| 2002/0159418 A1 | * | 10/2002 | Rudnick et al. | ............. 370/338 |
| 2005/0239474 A9 | * | 10/2005 | Liang | ........................ 455/454 |

OTHER PUBLICATIONS

M. Kalia, et al.; Data Scheduling and SAR for Bluetooth MAC; IEEE VTC 2000 Conference Proceedings, pp. 716-720, May 2000.

S. Garg, et al.; MAC Scheduling Policies for Power Optimization in Bluetooth: A Master Driven TDD Wireless System; IEEE VTC 2000 Conference Proceedings, pp. 196-200, May 2000.

M. Kalia, et al.; MAC Scheduling and SAR policies for Bluetooth: A Master Driven TDD Pico-Cellular Wireless System; International Workshop on Mobile Multimedia Communications, Nov. 1999; pp. 384-388.

* cited by examiner

*Primary Examiner*—Kwang B. Yao
*Assistant Examiner*—Warner Wong

(57) ABSTRACT

Method of prioritising the usage of slotted links by single network devices in a wireless network for adapting to varying traffic loads, comprising the steps of pre-setting a distribution of priorities for using a link to predetermined values, monitoring the current link usage, and adapting the priorities in accordance with the monitored usage.

30 Claims, 2 Drawing Sheets

Slot accounting with differing slot timings

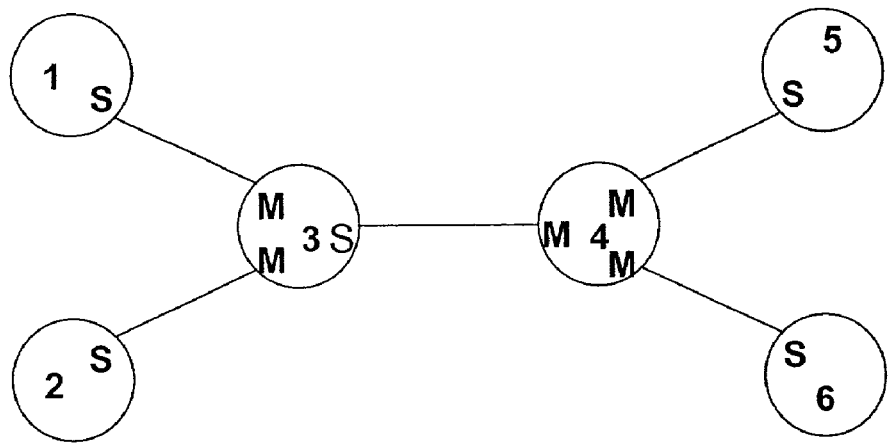
Figure 1: Example topology with 6 devices and 5 connections
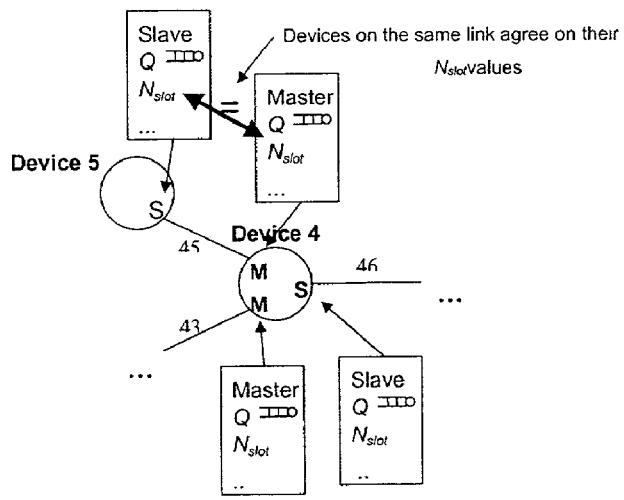
Figure 2: Each device stores the state of each of its communication links
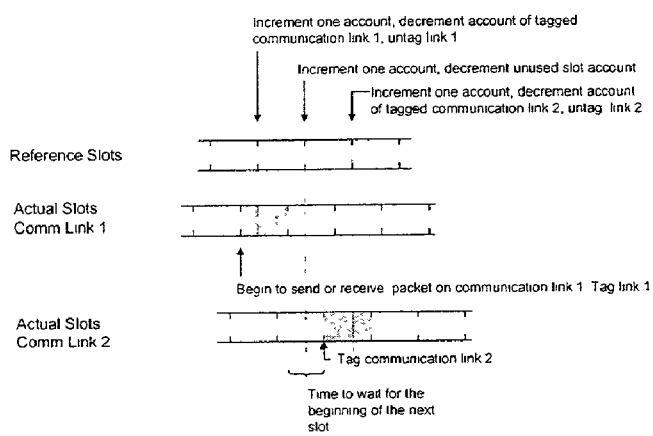
Figure 3: Slot accounting with differing slot timings

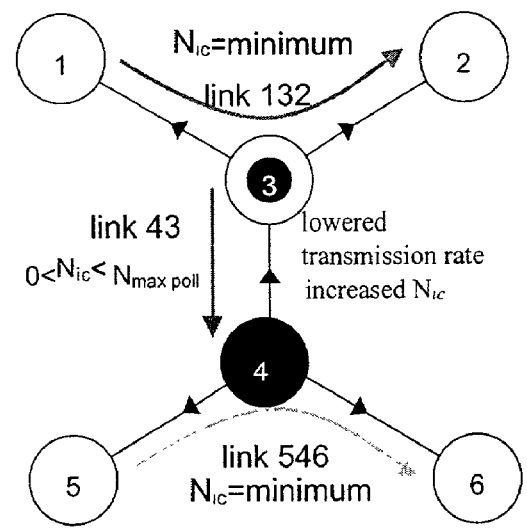
Figure 4: Scenario that demonstrates the dynamic adaptation of $N_{interslot}$ distribution

METHOD AND APPARATUS OF PRIORITISING THE USAGE OF SLOTTED LINKS BY SINGLE NETWORK DEVICES IN A WIRELESS NETWORK

BACKGROUND OF THE INVENTION

The present invention relates to networks, especially wireless networks communicating between single devices. In particular the present invention relates to network topologies where devices communicate over slotted point-to-point links. More particularly the present invention relates to networks where one device can be connected to multiple other devices, wherein the one device can only communicate with one other device at a time.

Conventional networks, for example a network of microprocessor controlled devices such as computer, printers, modems etc. have relied upon physical wire connections between the devices in the network. Due to the physical nature of the connection required, conventional networks are generally perceived to be fairly rigid in nature. For example, in order to add an additional device into the network, the additional device must be physically connected to the network, and the network server may have to be informed that the additional device has been connected.

Recently however, it has been observed an emerge of wireless networks, in which the network connections are provided, typically by a wireless radio link. One of these networks is described in the various Bluetooth standards (see e.g. http://www.bluetooth.com). Those skilled in the art will appreciate that other wireless networks also exist, and reference herein to Bluetooth is not intended to be limited hereto.

Bluetooth wireless technology allows users to make effortless, wireless and instant connections between various communication devices, such as mobile phones, computers, printers etc. Bluetooth technology provides for a short-range wireless connectivity and supports both point-to-point and point-to-multipoint connections. Currently, up to seven active 'slave' devices can communicate with a 'master' device, to form a 'piconet'. Several of these 'piconets' can be established and linked together in ad hoc 'scattemets', to allow communication among continually flexible configurations.

Due to the wireless nature of the piconet and the scattemet, and to minimise the expense, most of the wireless network devices comprise only one data-transceiver. Therefore the network devices are only capable of communicating with one other network device at a time. Within a piconet with only one master and up to 7 active slaves no special scheduling process has to be used to execute a nearly optimised data transfer. This is due to the fact that the master usually is the device having most computing power, and the slaves usually are peripheral applications for the master device. In this topology the overall communication performance is optimised, when the communication of the master is optimised. At the level of scatternets, the overall communication performance is depending on other parameters. In a scattemet one network device is not fixed with its role to be master or slave, but can be master to some of its links and simultaneously be slave to some other of its links. Therefore an arbitrary or even distribution of priorities or transmission times can always be expected to be suboptimal.

Prior solutions concerning connections between piconets, such as WO 99/14898 regarding 'Contemporaneous connectivity to multiple piconets' have been based on the utilisation of a specified Bluetooth low-power modes and negotiated time periods and were therefore bound to act within certain corresponding limits, e.g. communication overhead resulting from parameter negotiation. In addition, a periodic behaviour was assumed, thereby restricting the adaptivity to varying traffic loads and topologies to a minimum.

One of the problems with the creation of slotted networks is to optimise the overall communication performance.

Another problem with the creation of slotted networks is the fact that the network devices are movable and so the traffic load on the links changes with the location of each network device.

Another problem related to slotted networks is to share the available communication time in a fair manner.

SUMMARY OF THE INVENTION

According to a first aspect of the present invention, there is provided a method of prioritising the usage of slotted links by single network devices in a wireless network for adapting to varying traffic loads, comprising the steps of: pre-setting a distribution of priorities for using a link to predetermined values, monitoring the current link usage, and adapting the priorities in accordance with the monitored usage. By pre-setting the distribution of priorities an even distribution of the priorities among the links to use the links can be chosen. In a further developed network, devices may store an average priority distribution of previously averaged values obtained during a prior time interval to start with a pre-optimised priority distribution. By monitoring the current link usage, the network devices can detect by themselves if the current priority distribution is optimal or not. By adapting the priorities in accordance with the monitored usage, the network device can self adapt and optimise the local communication performance.

The fundamental concept of the present invention is to increase the overall communication performance by optimising the local communication performances of each network device. Slotted links usually transmit data in packets, each fitting into a slot or a number of slots. At least three different types of packets have to be distinguished. First, there is an ordinary data packet that may carry additional control information. Secondly, there is a data-less so-called NULL packet that is sent by a device that has no data to send. Thirdly, there is a so-called ABORT packet that does not carry any data but provides a Boolean flag (redistribute flag). The ABORT packet may be used at the end of contacts. The ABORT packet can be used to adapt the priorities of the single links or network devices.

BRIEF DESCRIPTION OF THE DRAWINGS

In the following, the invention will be described in detail by referring to the enclosed drawings in which:

FIG. 1 shows a network topology consisting of devices and communication links.

FIG. 2 shows a node in a network according to the present invention.

FIG. 3 shows a timing diagram of slot accounting with differing slot timings.

FIG. 4 shows the network topology of FIG. 1 with an uneven data traffic distribution.

DETAILED DESCRIPTION

Turning to the drawings, FIG. 1 shows a topology consisting of devices 1-6 and communication links between the devices 1-6 are given. Communication links are point-to-point and are used to exchange data or control packets between the two devices involved. One of the two devices participating in a communication link is the master M of the link while the other one is the slave S. The master M or the slave S role a device 1-6 adapts for a particular link is independent from the other communication links of the device 1-6. The master/slave role assignment for the connections of a topology is given in the beforehand. FIG. 1 shows an example of such a topology.

Preferably, the priority is divided into different levels of priority. By different levels of priority the different aspects of the communication can be considered to use different optimisation strategies to adapt to different network situations.

Advantageously, a first level of priority distinguishes between master and slave. A binary version of the master/slave concept may be sufficient for substantially linear network structures in which for example the main transmission direction may be inverted globally. In flexible network topologies with interconnection in which a single network device can be connected to more than one master, a binary master/slave concept is insufficient. In interconnected network structures a graduated master/slave concept can be applied, in which a slave can refuse an order from a master, if he is occupied with an order from another higher-ranking master. In a network of point-to-point links the single network devices have to agree about the values of master/slave at each end of a link. This concept may relate to a local master/slave definition or to a global master/slave definition. A global master/slave definition can prevent situations in which a slave device cannot decide which order is to be followed. A local master/slave definition enables the network to react flexibly to different network conditions, such as a change in the topology. Scatternets are extensions to existing Bluetooth single piconet topologies. They are enabled by Bluetooth devices participating in multiple piconets on a time-multiplexing basis, thereby adding scatternet support to the Bluetooth technology. Although very similar to sniff mode, scatternet mode is not intended for power saving purposes in the first place. It is nevertheless designed to enable Participants in Multiple Piconets (PMP) devices to save battery power in case of idle periods caused by inter-piconet multiplexing. A Bluetooth device in scatter mode can have different roles in different piconets. Scattemet mode is designed to easily allow switching between piconets in a time-multiplexing manner. The method applies independent of the master/slave role assignments.

Conveniently, a level of priority relates to the priority to use a link. By a graduated priority to use a link, the binary master/slave concept can be extended to a graduate master/slave concept. In the case of point-to-point links the authority to use a link is equivalent to a priority higher than the network device on the other end of the link.

Preferably, a third level of priority relates to the distribution of communication time between said devices. By a priority that is related to the communication time between the devices, an additional parameter can be introduced to enhance the optimisation of the communication between the single network devices. In a time division duplex (TDD) transfer mode, the other transfer parameter such as bandwidth or transfer rate are usually unchanged. In other transfer modes, other transfer parameter such as bandwidth, modulation and the like can be changed, too. In a communication link using a slotted communication scheme, the slot length can be changed.

The communication time can be defined as the number of slots that can be used in sequence. In a network using a slotted communication scheme with fixed length slots the variable communication time can only be changed in discrete steps of multiples of one slot length. The communication time can be scheduled in the value of a slot account s which defines the number of slots a terminal device can use in sequence.

Conveniently, communications between two devices of the network can only be started at a contact slot. By using contact slots single master/slave device pairs define a time in which a contact can be started. The master of a communication link is free to address the slave device in a contact slot by sending a data or control packet. The slave may listen to the packet beginning in this slot and respond by sending a packet. If it does so, a contact event starts. If only one of the devices tried to use a specific contact slot, the device performed an unsuccessful contact attempt. A device that does not use a contact slot in order to establish a contact event is free to use this slot for any other purpose, e.g. another contact event or a contact slot of another communication link. Basically, every contact slot can be used to start a contact event. Nevertheless, it is sometimes necessary and also reasonable to skip certain contact slots in order to continue the current contact event. Therefore, the contact slots comprise one parameter that determines a priority of the upcoming contact slot called slot account. There are two cases that have to be distinguished when considering the use of contact slots. The scheduling in the method is specifically designed to cope with the uncertainty of communication resulting in the proposed priority concept which monitors the amount of successful communication and adapts the used contacts slots and contact event lengths accordingly.

If there is no current active contact event in which the device is participating, any upcoming contact slot will be available for use. If there is a current contact event, an upcoming contact slot of a communication link other than the current one may trigger an interruption of the current contact event. In order to do so, the new communication link's slot account $S_{new}$ must exceed the current communication link's slot account $S_{current}$ by a certain threshold. This threshold may be defined as the maximum of the min_serve values of the old and the current communication link. Thus, the following equation must hold: $S_{new}-S_{current}$ max(min_serve$_{current}$, min_serve$_{new}$). It may happen that several contact slots of different communication links appear simultaneously. In this case, a priority scheme has to be devised that determines which communication link's contact slot to select for use.

Preferably, the repetition rate of the contact slots can be varied and the repetition rate is adjusted such that it is related to the monitored link usage. It may happen that a contact event ends immediately after a successful contact attempt because both devices do not have any data to send. As the two slots used for the contact attempt are effectively lost, it may be desirable to minimise the occurrence of this kind of event. Additionally, keeping the number of unsuccessful contact attempts low is crucial, because otherwise contact events are aborted needlessly.

Thus, it may be preferable to reduce the number of contact attempts on such communication links. To do so, a backoff counter is kept per communication link. This counter is increased and decreased at certain events. Higher values of the backoff counter mean that contact slots happen less frequently. Note that the backoff counter is only valid for communication links whose slot number value have not exceeded a predetermined value for the last contact by the value of maximum poll. If a device performed an unsuccessful contact event for a communication link, a backoff counter of this communication link should be increased.

Conveniently, said repetition rate of contact slots is varied by multiplication or division by two. This approach takes special provisions for the case that one peer chooses another backoff level than the other. This is obtained by multiplying or dividing the distance between subsequent contact slots only by 2. Therefore, the contact slots of a higher backoff level are always a subset of the contact slots of a lower level. Other multipliers are also possible, but larger multipliers have the drawback of too coarse gradation between the highest and the lowest parameter. In the case of a range of 1 to 512 communication slots, the multiplier 2 provides 10 different grades, while the multiplier 3 only provides 6 grades. It is to be noted that the multiplication is to be limited at both ends. The lower limit can be e.g. $1=2^0$ as the smallest communication comprises one slot, and the upper limit can be e.g. $512=2^9$ to prevent a "wind up effect". A "wind up effect" would e.g. occur for a multiplier 2, if e.g. the backup counter is set to 64, and the asserted slot account would take a few centuries to execute.

Advantageously, one level of priority is related to the time passed since the last successful contact. The priority of a link between two devices can be increased with the time passed since the last contact. This adapts the time passed since the last contact to the priority to account for disadvantages of a low contact frequency with a high priority. To prevent that a single device is leaving the network unnoticed, or to prevent that a single network device accumulates too much data, predetermined time intervals are agreed upon after which the priority of a contact slot is set to a maximum or at least increased. This prevents that the backoff counter 'winds up' which means that the distance between two contact slots get notable by a network user. Therefore a current contact event may also be aborted by the use of a contact slot of a communication link, whose slot number value exceeds a predetermined value for the last contact by the value of maximum poll. In a final step, the device that aborts the current contact event to use an upcoming contact slot may inform the current peer device by sending an ABORT packet with the appropriate value of the redistribute flag (FALSE, if slot number of the new communication link exceeded the maximum poll value. TRUE, otherwise).

Conveniently, communication related data is transferred from one device to another. When using a frequency hopping transmission algorithm this can be the hop sequence or such kind of data which is used for its calculation. The communication related data can be related to required transmission power, e.g. a power-save mode for the transmission devices used in the radio connection. The communication related data can comprise data about the transfer rate. Even information about the expected remaining operation time for fully mobile terminal devices as mobile computers or like may be included. The information can comprise the expected length of the next transmission or the expected priorities of the next transmission, or even the expected time of the next transmission having a higher priority.

Preferably, the method of prioritising further comprises the optional step of interrupting a transmission, especially of lower priority. Especially in data transmission networks, a priority comprises in a first level the priority to access a data transmission link after the termination of a current transmission. A second level of priority can allow a device to interrupt a current transmission of lower priority. It is for example conceivable for a master to cope with the situation in which a slave does not respond to polls, which can easily happen in a wireless network e.g. due to location changes of slave devices. Therefore, the master device needs an algorithm to add or delete other slave or master devices to or from the present links. To prevent that a single device is deleted from the present link, and later has to be re-added after a certain period, the priority can be related to the time passed since the last contact. Therefore, if a single slave device is to be deleted during a current transmission, the priority of said device should be set to a maximum to interrupt the current transmission, contact the master device and prevent deletion from the link, in order to avoid time consuming re-adding procedures.

An abortion of a transmission is useful in the case of e.g. a linear tree device sub-network, wherein a first device is slave to a second device which is at the same time slave to a third device. In this sub-net structure the third device may not access the second device, if it is occupied with a long data communication to the first device. To prevent that the third device is blocked in its communication to the second device, the second device is enabled to abort the data transmission between the first and the second device. The interruption of a current transmission can be executed by an ABORT packet. The ABORT packet can contain a specific address and sender of a certain device to prevent that ABORT packets of uncertain origin may interrupt a current transmission.

Preferably, the prioritising of each link comprises the monitoring and adapting of the values of a current slot number ($N_{slot}$), an amount of slots ($N_{contact\_timeout}$) after which a contact event is considered to be finished, and a next possible contact timestamp ($N_{next\_contact}$). The value of the role distinguishes in the simplest way between master M and slave S. The role primarily defines the direction of a communication link, in which orders are transferred. It is a first level prioritisation between two network devices. The network is a slotted network, which At means that transmissions are time discrete. A slot may be as long as a transfer unit in a time division duplex (TDD) transfer mode. Especially in the combination with other transfer modes using frequency-hopping algorithms, a slot can be as long as the time the algorithm uses a single frequency. To be able to define a certain slot in which a data transfer can be executed the slots are numbered. This number is the slot number $N_{slot}$. The master and the slave have to agree upon the actual value of $N_{slot}$ to enable both systems to communicate with each other. Some slots can be used to start communication, wherein such a slot is called contact slot $N_{contact}$. By using contact slots, single master slave device pairs can define a discrete point time in which a contact can be started. Both devices need to use the same algorithm to calculate the next $N_{contact}$. It is not sufficient to transfer a $N_{next}$ contact at each $N_{contact}$, because if in one $N_{contact}$ the transmission of the location of the next $N_{contact}$ fails, the system has no chance to recover. So the system needs an algorithm, in which the $N_{next}$ contact can be calculated. Each communication link may have its own contact slots and method of calculating contact slots. Contact slots of different communication links may even be completely unrelated. Thus, it may happen that contact slots of different communication links overlap each other.

Master and slave device of a particular communication link must have a high probability of determining the same next contact slot for the communication link. This way, it is guaranteed that master and slave may initiate a contact event if both devices want to communicate with each other. Particular care must be taken when using the proposed backoff mechanism. This mechanism must be chosen adequately to allow two devices to meet after some bounded time. A simple method to determine contact slots is to place them equidistantly into the predefined slotting. For this, the two parameters $N_{inter\_contact}$ and $0 \; N_{contact\_offset} < N_{inter\_contact}$ are defined. The first parameter defines the distance between two contact slots, the second parameter defines the relative placement within the slotting. The slot with the slot number $N_{slot}$ is a contact slot, if: $N_{slot}$ mod $N_{inter\_contact} = N_{contact\_offset}$. If $N_{next\_contact}$ has to be found, the smallest slot number after the current slot number fulfilling the equations above is taken.

The simplest case for regular placement is obtained by setting Ninter-contact to 1 and $N_{contact\_offset}$ to 0.

Additionally, both devices can store data related to the estimated length of the transmission. Therefore both network devices will know how long the actual transmission will last. In each slot a packet containing data or other information can be transferred. Longer packets that use more than a single slot are possible. Three different types of packet have to be distinguished. First, there is an ordinary data packet that may carry additional control information. Second, there is a dataless so-called NULL packet that is sent by a device that has no data to send. Third, there is a so-called ABORT packet that does not carry any data but provides a Boolean flag (redistribute flag). The ABORT packet may be used at the end of contact events. After a contact event has been established between two devices by using the same contact slot on both sides of their communication link, the two devices continue to exchange data until the contact event ends. Both devices may decide to end the current contact event at any time. While peer devices A and B are in a contact event on a communication link, device A may decide to end the current contact event and start one with another device without notifying device B. As device B does not notice the other device leaving, it will end the contact event after a timeout, i.e. when the current slot number $N_{slot}$ exceeds $N_{last\_contact}$ by the threshold $N_{contact\_timeout}$. An implicit end of a contact event may trigger a redistribution of slots.

There are three possibilities for an explicit end of a contact event. First a reception of an ABORT control packet. A device that ends a contact event may send the ABORT control packet to notify its peer. Thus, a device that receives an ABORT packet immediately regards the current contact event as finished. A redistribution of slots may be started on the receiving device, depending on the status of the redistribute control flag of the ABORT packet. Second a double NULL sequence. If the queues of both devices of a communication link become empty, the devices will transmit NULL packets. Thus, after the slave answers a master's NULL packet with a NULL packet, both devices immediately regard the current contact event as finished. In case of double NULL sequence a redistribution of slots may be triggered on both devices. Third a start of another contact event with higher priority A device may also end the current contact event because it uses a contact slot of another communication link in the next slot. The peer device of the communication link will notice the end of the contact event either explicitly (if an ABORT packet is sent to the peer device) or implicitly (if no such packet is sent).

Conveniently, the method of prioritising the slotted links in a network further comprises a step of storing a number of slots ($N_{max\_poll}$) after which the priority to contact the peer device is increased and a last contact timestamp ($N_{last\_contact}$). By the values of $N_{slot}$ and $N_{last\_contact}$ the device can count or calculate the time since the last successful contact. A device with low priority and low data transfer rates is always endangered to loose the contact to the network, or that the network 'forgets' a link or a device. To prevent this, the priority of a network device is increased, if too much time has passed since the last successful contact. Since there were no transmissions, both master and slave have to use the same algorithm to increase the priority of the link. The priority can be increased stepwise or be set to maximum, if Nmax poll was reached. Preferably, the adaptation of the priorities includes the adaptation of a slot account (us) and a slot account threshold (min serve). Slot accounting is usually performed at the beginning of each slot. If several different definitions of slot timing are present on one device, one is chosen as the reference timing.

Slot accounting is done at the beginning of each slot in the reference timing. However, this timing is not necessarily used to send or receive the last packet. Therefore, at each beginning of a slot of a communication link where a packet is currently sent or received, the communication link is tagged. At the beginning of each reference slot, the tagged communication link is accounted for the last send/receive slot, i.e. its slot account decrements by one. The tag is removed after accounting.

Most preferred is a method to achieve a fair distribution of communication time by scheduling contact events and redistributing slots using slot accounts. Thereby a redistribution of slot account values is readily obtained.

Preferably, the method of prioritising the usage of slotted links in a network comprises the step that the slot account (s) is (are) extended with an unused slot account (us). It may happen that no device is tagged at accounting time. In this case, the unused slot account (us) is accounted. At the beginning of each slot, the slot account of one communication link in each device is increased by one. However, if the account for unused slots us is below zero, this account has to be increased by one and no other account is increased.

Accounts should be increased proportionally to the desired share that a communication link should get out of the overall amount of slots. In the most simple case, where all communication links are treated equally, all accounts get an equal share of the slots (in the long run). An approach to achieve this is to perform the increase of the accounts in a round robin fashion. If anything was sent or received during the last slot, one decreases the slot account of the communication link that was used for the transfer. If nothing was sent or received during the last slot, the unused slot account us is decreased by one. Consequently, in each device, the sum of the unused slot account and of all slot accounts for communication links is always 0 after the increase and decrease operations at the beginning of a slot have been performed. Peer devices that used more than their assigned share of slots in the past will have negative slot accounts and peer devices that did not use up their assigned share of slots in the past will have positive slot accounts. It is desired to limit the maximum and minimum values of slot accounts in order to limit the amount of unfairness the algorithm compensates for. If a slot account reaches its maximum value it must not be elected for incrementation at the beginning of a slot. Instead of decrementing a slot account that has reached its minimum value, the unused slot account us should be decremented. In order to allocate slots to communication links in a fair manner, the proposed scheduling mechanism tries to balance the slot accounts by scheduling contact events appropriately and by redistributing slots.

Generally, a redistribution of slots takes a certain amount of slots from the slot account of the current communication link and distributes it among the other communication links. In the simplest case, where all devices are treated equally, the slots are distributed evenly among the other communication links. Of course, the sum of all slot accounts and us remains zero. The amount of slots to distribute can be computed in various ways. One option is to distribute all the positive slot account values (i.e. after the redistribution the slot account is zero). Another way would be to distribute slots in such a way that the value of the current communication link's account equals that of the lowest slot account after evenly distributing slots among the remaining communication links. In this case, the amount of slots to distribute is given by $$(s_{current} - s_{min}) * (n-1)/n,$$

where scurrent is the value of the current communication link's account, $s_{min}$ is the value of the lowest account and n is the number of communication links of the device. Note that only credits are distributed, if $s_{current} > s_{min}$.

Advantageously, the method of prioritising the usage of slotted links in a network further comprises storing and adapting a value of a backoff counter (b), which is related to the distance between two contact slots $N_{contact}$. It may happen that a contact event ends immediately after a successful contact attempt because both devices do not have any data to send. As the two slots used for the contact attempt are effectively lost, it may be desirable to minimize the occurrence of this kind of event. Additionally, keeping the number of unsuccessful contact attempts low is crucial, because otherwise contact events are aborted needlessly. Thus, it may be preferable to reduce the number of contact attempts on such communication links. To do so, a backoff counter is kept in each communication link. This counter is increased and decreased by and at certain events. Higher values of the backoff counter mean that contact slots happen less frequently. Note that the backoff counter is only valid for communication links whose $N_{slot}$ value has not exceeded $N_{last\_contact}$ by the value of $N_{max\_poll}$.

If the backoff counter b and equidistant placement of contact slots is implemented, $N_{slot}$ is a contact slot, if $$N_{slot} \bmod 2^b N_{inter\_contact} = N_{contact\_offset}.$$

If a device performed an unsuccessful contact event for a communication link, the backoff counter of this communication link should be increased. Other definitions of backoff counter are possible.

According to another aspect of the present invention, a software tool for prioritising the usage of slotted links in a network is provided, which comprises program code means for performing all the steps of anyone of the preceding method claims when said software tool is run on a computer or a network device.

According to another aspect of the present invention, a computer program for prioritising the usage of slotted links in a network is provided, which comprises program code means for performing all the steps of anyone of the preceding method claims when said program is run on a computer or a network device.

According to yet another aspect of the invention, a computer program product is provided comprising program code means stored on a computer readable medium for performing the method of anyone of the preceding method claims when said program product is run on a computer or network device.

According to yet another aspect of the invention a network device is provided, which is capable of prioritising the usage of slotted links in a network and comprises means for presetting a distribution of properties for using a link to predetermined values, means for monitoring the current link usage, and means for adapting the current link usage in accordance with the monitored usage. With this device it is possible to start the optimisation with a predefined priority distribution. The start distribution can be always the same, e.g. stored in a ROM (read only memory), by the last used distribution, or may be varied in an optimisation process to find an optimal start distribution for the optimisation process.

Conveniently, the network device comprises means for storing transmission related data. These data can comprise the value of a role, which determined if the device is slave or master to the respective link, the value of Slot number $N_{slot}$, the value of $N_{max}$ poll, the value of $N_{inter\_contact}$, $N_{contact\_timeout}$ and $N_{contact\_offset}$ which form the base for the calculation of the values of $N_{next\_contact}$, $N_{last\_contact}$, the slot account s, the unused slot account us and the backoff counter b. Some of the calculated values have to be stored, too.

Preferably, a network device further comprises storing means for incoming and outgoing data. Storing means can be data queues or other storage devices used in computers. The memory is an important part of the network device as it is not able to receive and transmit data at the same time. The handling of simple instantaneously executable commands does not need storage devices. Data transmission may take longer, and may be non-interruptable. As transmissions may occupy multiple slots, it is sometimes necessary to interrupt an ongoing transmission to attend a contact slot. This may happen on the receiving as well as on the sending side. There may be situations where transmissions cannot be interrupted. In order to cope with this constraint, the use of contact slots has to be planned beforehand. Of course, the number of slots to look in the future depends on the maximum length of a transmission (counted in slots). In addition to that, it may be necessary to restrict the length of transmissions of the peer device (e.g. by attaching respective control data to ordinary data packets). A storing means must be provided in case the device operates in a non-slot synchronised way, as is the case with a printer in which the data receiving rate is much higher than the printing rate. In an external random access memory device, for example a separate data queue can be installed, such that the device may operate in a slot synchronised way, without time delay between the data access and the data transmission.

According to a further aspect of the invention a network comprising network devices as claimed in previous network claims is provided. Such an 'all wireless' network is highly flexible and self organising in its structure. With a range of approximately 10 m in buildings and an estimated bureau volume of about 40 m³ up to 30 other bureau may be in the range of one network device. With the estimation of up to 7 network devices, up to 200 devices may be in the accessible range of one single wireless network device. Therefore, the transfer between these network devices is optimised.

In a scattemet, a special prevention and surveillance of the scattemet has to be performed to prevent industrial espionage. Therefore each scattemet device may comprise authentication and encryption to ensure that all devices participating in the scattemet are allowed to do so. This may however complicate direct access to the scattemet. Scatternets even having a range of 10 to 100 m may be intercepted from greater distances by the use of directional aerials. As one option to create an authentication, a SIM (Subscriber Identification Module) may be used to ensure system access, wherein a user may only get access to the net, if a removable SIM is inserted into his personal device as an electronic key. The SIM concept may be used to define a global graduate master/slave concept.

Turning to the drawings, FIG. 1 shows a topology consisting of devices 1-6 and communication links between the devices 1-6 are given. Communication links are point-to-point and are used to exchange data or control packets between the two devices involved. One of the two devices participating in a communication link is the master M of the link while the other one is the slave S. The master M or the slave S role a device 1-6 adapts for a particular link is independent from the other communication links of the device 1-6. The master/slave role assignment for the connections of a topology is given in the beforehand. FIG. 1 shows an example of such a topology.

FIG. 2 shows a node in a network according to the present invention. A device 4 may only communicate over one communication link with one other device (only device 5 is shown in the drawing) at the time. In order to communicate over several links 43, 45, 46 a device must switch between communication links 43, 45, 46 using a time division multiplex scheme. Communication between two devices 4, 5 over a communication link 45 is only possible if both devices use the same communication link 45 at the same time.

If two devices 4, 5 communicate with each other over a communication link 45, the master device 4 of the communication link 45 determines the communication parameters (e.g. timing, slot numbers, frequencies, ... partially shown in the box) and the slave device 5 adapts to these parameters. Devices use a slotted communication scheme. The master device 4 determines the slotting on a communication link 45. To simplify the description of the proposed prioritisation method, it is assumed that the slots are aligned throughout the whole network. In order to identify the slots, the master device 4 assigns a slot number $N_{slot}$ to each slot. It is assumed that the slave device 5 knows the communication parameters of the master device 4 including the slot numbers $N_{slot}$. A slave device 5 is only allowed to send a packet if the master device 4 polls it. This may happen using a normal data packet, or using a control packet containing no data (a so-called NULL packet). The slave device 5 is required to respond to every master device 4 packet by sending any packet (with or without data). Packets that use more than a single slot are possible. The master of each link defines the communication parameters and the priority parameters (the values of M/S, $N_{inter\_contacts}$, ...) of the links.

FIG. 3 shows a timing diagram of slot accounting with differing slot timings. Up to now, it was assumed that all devices in a network use the same slot definitions. In the following, we introduce the adaptations that have to be made to the proposed mechanisms in order to support differing slot definitions on each master. However, a slave in a communication link continues to know the slot definition of its master, as it has to follow the master's timing when communicating with the master. In general, two problems have to be solved. Firstly, management of the slot accounts has to be done for different slot timings. Secondly, when contact slots are used, the time shift between different communication links has to be taken into account. It was assumed that all slots throughout the whole network are synchronised, so slot accounting can be performed at the beginning of each slot. If several different definitions of slot timing are present on one device, one is chosen as the reference timing. Slot accounting is done at the beginning of each slot in the reference timing. However, this timing was not necessarily used to send or receive the last packet. Therefore, at each beginning of a slot of a communication link where a packet is currently sent or received, the communication link is tagged. At the beginning of each reference slot, the tagged communication link is accounted for the last send/receive slot, i.e. its slot account is decremented by one. The tag is removed after accounting. It may happen that no device is tagged at accounting time. In this case, the unused slot account us is accounted.

FIG. 4 shows the network topology of FIG. 1 with an uneven data traffic distribution. As in FIG. 1 network device 4 is master to the network devices 3, 5 and 6. The network device 3 is slave to device 4 and master to devices 1 and 2. Links are numbered in accordance with the enumeration of the devices they are connecting. The arrows on the links indicate the master/slave relation of the link, and therefore the first level of priority. In the example, two big data transfers are taking place. The first from device 1 to device 2 via device 3 and the links 31 and 32, which is abbreviated link 132. And abbreviated in the same manner a second data transfer on link 546 takes place. At the same time, there is no transmission on link 43. Therefore the distance between two contact slots is increased by the backoff counter and simultaneously the number of slots usable in sequence can be decreased by slot redistribution. Therefore, device 3 primarily transfers data from device 1 to device 2, temporarily checking link 43, preventing to waste too much time on an unused link. Device 4 primarily transfers data from device 5 to device 6, temporarily checking link 43, preventing to waste too much time on an unused link. And therefore, the values of $N_{ic}=2^b N_{inter\_contact}$ between two contact slots on the links 132 and 546 are set to minimum, so that both links nearly occupy the whole transmission time of the devices 3 and 4. On link 43, $N_{ic}$, increases till $N_{ic}$ exceeds $N_{max\,poll}$, then only $N_{max\,poll}$ is respected to prevent a 'wind up' effect.

This application contains the description of implementations and embodiments of the present invention with the help of examples. It will be appreciated by a person skilled in the art that the present invention is not restricted to details of the embodiments presented above, and that the invention can also be implemented in another form without deviating from the scope of the appending claims. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. A method for determining a contact slot for communication between device in a slotted communication system, the method comprising:

identifying a current slot number of a slotted communication system at a first device;

determining a first value of a first parameter at the first device, the first parameter defining a distance between contact slots for communicating with a second device;

determining a second value of a second parameter at the first device, the second parameter defining an offset distance from a start of a contact slot for communicating with the second device;

determining a next contact slot for communicating with the second device, wherein the next contact slot is a smallest slot number after the identified current slot number that satisfies $N_{slot}$ mod $N_{inter\_contact}=N_{contact\_offset}$ where $N_{slot}$ is the smallest slot number after the identified current slot number, $N_{inter\_contact}$ is the determined first value, and $N_{contact\_offset}$ is the determined second value; and communicating with the second device at a contact time based on the determined next contact slot.

2. The method of claim 1, further comprising determining a third value of a third parameter at the first device, the third parameter defining a backoff counter for communicating with the second device, wherein the next contact slot is determined based on $N_{slot}$ mod $2^b N_{inter\_contact}=N_{contact\_offset}$ where b is the determined third value.

3. The method of claim 1, further comprising adjusting the determined third value unless $2^b N_{inter\_contact} > N_{max\_poll}$ where $N_{max\_poll}$ is a maximum number of slots to allow since a last successful contact event.

4. The method of claim 1, further comprising adjusting the determined first value based on a priority of the communication with the second device.

5. The method of claim 4, wherein the determined first value is adjusted by a factor of 2.

6. The method of claim 4, wherein the determined first value is adjusted based on a time period since a last successful contact event.

7. The method of claim 4, further comprising increasing the priority of the communication with the second device if a third device is no longer communicating with the first device.

8. The method of claim 4, further comprising increasing the priority of the communication with the second device up to a maximum priority value.

9. The method of claim 4, further comprising increasing the priority of the communication with the second device after a time since a last successful contact event exceeds a maximum value.

10. A method for redistributing slots for communication between devices in a slotted communication system, the method comprising:
   identifying an occurrence of a redistribution event at a first device;
   identifying a priority of a current communication link of a plurality of communication links between the first device and a plurality of devices;
   determining a first value of a first parameter at the first device, the first parameter defining a lowest priority associated with the plurality of communication links;
   determining a number of slots to redistribute among the plurality of communication links, wherein the number of slots is calculated as $(S_{current}-S_{min})*(n-1)/n$ where $S_{current}$ is the identified priority, $S_{min}$ is the determined first value, and n is the number of the plurality of communication links; and
   redistributing the determined number of slots among the plurality of communication links.

11. The method of claim 10, wherein the redistribution event is indicated by sending an ABORT packet to the second device.

12. The method of claim 10, wherein the redistribution event is indicated by sending a NULL packet to the second device.

13. The method of claim 12, wherein the redistribution event is further indicated by receiving a second NULL packet from the second device.

14. The method of claim 10, wherein the redistribution event is indicated by not receiving a communication from a second device of the plurality of devices within a timeout period.

15. The method of claim 10, wherein the redistribution event is indicated by communicating with a second device at a contact time instead of a third device based on a priority of a communication with the second device relative to a second priority of a second communication with a third device.

16. The method of claim 15, wherein the redistribution event is further indicated by sending an ABORT packet to the third device.

17. A device comprising:
   means for identifying a current slot number of a slotted communication system;
   means for determining a first value of a first parameter, the first parameter defining a distance between contact slots for communicating with a second device;
   means for determining a second value of a second parameter, the second parameter defining an offset distance from a start of a contact slot for communicating with the second device;
   means for determining a next contact slot for communicating with the second device, wherein the next contact slot is a smallest slot number after the identified current slot number that satisfies $N_{slot}$ mod $N_{inter\_contact}=N_{contact\_offset}$ where $N_{slot}$ is the smallest slot number after the identified current slot number, $N_{inter\_contact}$ is the determined first value, and $N_{contact\_offset}$ is the determined second value; and
   means for communicating with the second device at a contact time based on the determined next contact slot.

18. The device of claim 17, further comprising means for determining a third value of a third parameter, the third parameter defining a backoff counter for communicating with the second device, wherein the next contact slot is determined based on $N_{slot}$ mod $2^b N_{inter\_contact}=N_{contact\_offset}$ where b is the determined third value.

19. The device of claim 17, further comprising means for adjusting the determined third value unless $2^b N_{inter\_contact} > N_{max\_poll}$ where $N_{max\_poll}$ is a maximum number of slots to allow since a last successful contact event.

20. The device of claim 17, further comprising means for adjusting the determined first value based on a priority of the communication with the second device.

21. The device of claim 20, wherein the determined first value is adjusted by a factor of 2.

22. The device of claim 20, wherein the determined first value is adjusted based on a time period since a last successful contact event.

23. The device of claim 20, further comprising means for increasing the priority of the communication with the second device if a third device is no longer communicating with the device.

24. The device of claim 20, further comprising means for increasing the priority of the communication with the second device up to a maximum priority value.

25. The device of claim 20, further comprising means for increasing the priority of the communication with the second device after a time since a last successful contact event exceeds a maximum value.

26. A device, the device comprising:
   means for identifying an occurrence of a redistribution event;
   means for identifying a priority of a current communication link of a plurality of communication links between the device and a plurality of devices;
   means for determining a first value of a first parameter, the first parameter defining a lowest priority associated with the plurality of communication links;
   means for determining a number of slots to redistribute among the plurality of communication links, wherein the number of slots is calculated as $(S_{current}-S_{min})*(n-1)/n$ where $S_{current}$ is the identified priority, $S_{min}$ is the determined first value, and n is the number of the plurality of communication links; and
   means for redistributing the determined number of slots, among the plurality of communication links.

27. The device of claim 26, wherein the redistribution event is indicated by sending an ABORT packet to the second device.

28. The device of claim 26, wherein the redistribution event is indicated by sending a NULL packet to the second device.

29. The device of claim 28, wherein the redistribution event is further indicated by receiving a second NULL packet from the second device.

30. The device of claim 26, wherein the redistribution event is indicated by not receiving a communication from a second device of the plurality of devices within a timeout period.

* * * * *

UNITED STATES PATENT AND TRADEMARK OFFICE
CERTIFICATE OF CORRECTION

PATENT NO. : 7,430,217 B2
APPLICATION NO. : 10/108859
DATED : September 30, 2008
INVENTOR(S) : Carmen Kühl et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 1,138 days.

should read (*) Notice: Subject to any disclaimer, the term of this patent is extended or adjusted under 35 U.S.C. 154(b) by 1,388 days.

Signed and Sealed this

Fourth Day of May, 2010

David J. Kappos
*Director of the United States Patent and Trademark Office*